(12) United States Patent
Ahas

(10) Patent No.: US 12,346,535 B2
(45) Date of Patent: Jul. 1, 2025

(54) SELECTING ITEMS FROM A DATABASE

(71) Applicant: Subfiber OÜ, Tallinn (EE)

(72) Inventor: Ahto Ahas, Tallinn (EE)

(73) Assignee: Subfiber OÜ, Tallinn (EE)

( * ) Notice: Subject to any disclaimer, the term of this patent is extended or adjusted under 35 U.S.C. 154(b) by 41 days.

(21) Appl. No.: 17/635,781

(22) PCT Filed: Aug. 14, 2020

(86) PCT No.: PCT/EP2020/072870
§ 371 (c)(1),
(2) Date: Feb. 16, 2022

(87) PCT Pub. No.: WO2021/032620
PCT Pub. Date: Feb. 25, 2021

(65) Prior Publication Data
US 2022/0300124 A1   Sep. 22, 2022

(30) Foreign Application Priority Data
Aug. 16, 2019   (GB) .................................... 1911756

(51) Int. Cl.
*G06F 3/0482* (2013.01)
*G06F 3/04845* (2022.01)
(Continued)

(52) U.S. Cl.
CPC ........ *G06F 3/0482* (2013.01); *G06F 3/04845* (2013.01); *G06F 3/0485* (2013.01); *G06F 16/54* (2019.01)

(58) Field of Classification Search
None
See application file for complete search history.

(56) References Cited

U.S. PATENT DOCUMENTS

| | | | |
|---|---|---|---|
| 7,711,662 B2 * | 5/2010 | Buscema | G06N 3/086 706/13 |
| 8,417,712 B2 * | 4/2013 | Narayanan | G06F 16/58 707/772 |

(Continued)

FOREIGN PATENT DOCUMENTS

| | | | | |
|---|---|---|---|---|
| EP | 1367505 A1 * | 12/2003 | | G06F 16/58 |
| WO | WO-02079942 A2 * | 10/2002 | | G06Q 30/02 |

OTHER PUBLICATIONS

International Search Report and Written Opinion from corresponding International Patent Application No. PCT/EP2020/072870, dated Sep. 29, 2020.

(Continued)

*Primary Examiner* — Henry Orr
(74) *Attorney, Agent, or Firm* — Dergosits & Noah LLP; Todd A. Noah

(57) ABSTRACT

In one aspect, visual preference of a user is determined by selecting a display set of item images from at least one item database and causing the item images of the display set to be displayed at a user interface. Engagement events at the user interface between the user and engaged-with item images are detected and used to determine a visual preference hypothesis for the user based on visual features extracted from the engaged-with item images. New item images are selected from the database(s) by comparing their visual features with the visual preference hypothesis. This is an iterative process, in which the visual preference hypothesis is refined and the display set continues to be updated accordingly. In another aspect, an improved user interface facilitates efficient item selection based on active and/or passive engagement events (of various possible types) with an item array, providing a rich source of visual preference information.

18 Claims, 10 Drawing Sheets

(51) Int. Cl.
*G06F 3/0485* (2022.01)
*G06F 16/54* (2019.01)

(56) References Cited

U.S. PATENT DOCUMENTS

| | | | |
|---|---|---|---|
| 10,203,847 B1* | 2/2019 | Haitani | G06Q 30/00 |
| 11,532,024 B2* | 12/2022 | Chen | G06Q 30/0621 |
| 2010/0250336 A1* | 9/2010 | Selinger | G06Q 30/0643 |
| | | | 705/26.7 |
| 2016/0104057 A1* | 4/2016 | Shen | G06F 18/214 |
| | | | 382/159 |
| 2017/0091319 A1* | 3/2017 | Legrand | G06F 16/3346 |
| 2017/0124624 A1* | 5/2017 | Agrawal | G06Q 30/0201 |
| 2019/0130285 A1* | 5/2019 | Snyder | G06Q 30/0641 |
| 2019/0251446 A1* | 8/2019 | Fang | G06F 16/51 |

OTHER PUBLICATIONS

International Preliminary Report on Patentability from corresponding International Patent Application No. PCT/EP2020/072870, dated Nov. 22, 2021.
Grant Communication from the European Patent Office in corresponding European Patent Application No. 20757575.45, dated Mar. 12, 2024.

* cited by examiner

SELECTING ITEMS FROM A DATABASE

TECHNICAL FIELD

The present disclosure pertains to computer technology for selecting items from at least one item database for displaying at a user interface based on inputs received at the user interface.

BACKGROUND

A potentially large number of item records may be held in one or more item databases, which may be accessed via a user interface. The user interface may provide a search function which allows the item records to be searched based on one or more item attributes specified by a user. The item attributes may for example be specified in a text-based search term. Suitable keywords may be assigned to the item records which can then be compared to the text-based search term. Thus, a user may use the search function to search for any item record pertaining to an item having a specified set of attributes.

An inherent limitation of such search functions is the requirement for a user to specify the item attributes which form the basis of the search. The search function is therefore only useful in circumstances in which the user already has a specific set of item attribute(s) in mind.

An alternative means of locating desirable items may thus be provided in the form of a recommendation engine. One form of recommendation engine links together certain item records based on aggregate user behaviour. Accordingly, when a given user interacts with a particular item record, he or she may be presented with recommendations for one or more other items which have been linked to that particular item record based on aggregate historic behaviour of other users. For example, underlying machine learning algorithms may be trained to attempt to extract common behaviour patterns from historic user behaviour data to allow item records to be selectively linked together based on the extracted common behaviour patterns.

SUMMARY

Existing recommendation engines rely heavily on the ability to successfully extract common behavioural patterns from user behaviour data so that item records may be linked together in a meaningful way. One problem with approach is that, to be effective, large volumes of user behaviour data are usually required in order to effectively train the underlying machine learning algorithms. Another problem is the inherent assumption that such common behaviour patterns exist in the first place, i.e. the assumption that aggregate user behaviour is consistent and, moreover, provides a reliable indicator of a given user's preferences.

These problems are particularly acute when it comes to items having a complex visual appearance. Visual preference varies significantly between users, therefore reliably extracting common behaviour patterns from aggregate user behaviour data—assuming such common behaviour patterns even exist—would require a large amount of behaviour data and the application of complex behaviour pattern recognition algorithms. At best, a conventional recommendation engine would only be able to provide acceptable recommendations after a significant period of time during which the items have been available and a sufficiently large number of user interactions with the items had been recorded and analysed. At worst, such a recommendation would never perform effectively because the required data would be unavailable or not fit for purpose.

By contrast, the present technology allows a user to locate items in an item database according to individual visual preference, without any reliance on aggregate user behaviour data.

A first aspect of the present technology provides a computer-implemented method of determining visual preference of a user for selecting item images from at least one item database according to the visual preference of the user, the method being implemented by one or more computer processors and comprising:

selecting a display set of item images from the at least one item database;

causing the item images of the display set to be displayed at a user interface;

detecting engagement events at the user interface between the user and engaged-with item images of the display set;

using the detected engagement events to determine a visual preference hypothesis for the user based on visual features extracted from the engaged-with item images; and updating the display set with new item images selected from the at least one item database by comparing visual features extracted from the new item images with the at least one visual preference hypothesis;

wherein subsequent engagement events between the user and engaged-with new item images of the display set continue to be detected and used to refine the at least one visual preference hypothesis, and the display set continues to be updated as the visual preference hypothesis is refined.

Visual preference is a subjective preference for a visual appearance of an item, and can therefore vary significantly between different users. The presenting teachings allow information about any given user's particular visual preferences to be systematically inferred and applied, in a way that robustly accounts for the uniqueness of those subjective preferences, thus increasing the speed and efficiency with which any given user can locate visually appealing items.

When a user selects or otherwise engages with a particular item image, that does not necessarily mean he or she has a preference for all of the visual features of that item image.

Accordingly, in embodiments, the visual preference hypothesis may correspond to a type of visual feature or visual feature combination, and may bias the selection of the new item images toward item images having visual features or combinations of visual features of that corresponding type which match the visual preference hypothesis but which exhibit variation in at least one additional visual feature type for testing the visual preference hypothesis.

This provides an effective way of testing the visual preference hypothesis in question: if a user continues to select or otherwise engage with item images which match the visual preference hypothesis in the corresponding visual feature type(s), but otherwise differ visually, that behaviour is reasonably strong evidence that the visual preference hypothesis is correct.

For example, at least a first visual preference hypothesis and a second visual preference hypothesis may be determined using the engagement events. The first visual preference hypothesis may correspond to a first type of visual feature or visual feature combination, and bias the selection of a first subset of the new item images toward item images having visual features or combinations of visual features of that corresponding first type which match the first visual preference hypothesis but which exhibit variation in a second type of visual feature or visual feature combination. The second visual preference hypothesis may correspond to the second type of visual feature or visual feature combination, and bias the selection of a second subset of the new item images toward item images having visual features or combinations of visual features of that corresponding second type which match the second visual preference hypothesis but which exhibit variation in the first type of visual feature or visual feature combination.

The first and second visual hypothesis may, for example, be determined in response to the user engaging with at least one item image of the display set. The at least one engaged-with item image may have a visual feature or combination of visual features of the first type which is used to determine the first visual preference hypothesis. The at least one engaged-with item image may have a visual feature or combination of visual features of the second type which is used to determine the second visual preference hypothesis. The biased selection of the first and second subsets tests whether the user has a preference for (i) the visual feature or combination of visual features of the at least one engaged-with item image of the first type based on a response of the user to the first subset, or (ii) the visual feature or combination of visual features of the at least one engaged-with item image of the second type based on a response of the user to the second subset.

The engagement events may comprise at least one active engagement event in which the user selects an item image of the display set at the user interface.

The item images of the display set may be displayed at the user interface in an item array at respective array positions.

The item array may be zoomable and/or scrollable.

In response to the active engagement event, at least one item image may be removed from the display set, and replaced with one of the new item images displayed at the array position of the removed item image.

The removed item image is removed from the display set based on the array position of the removed item image relative to the selected item image. That is, an item image may be selected for removal based on its proximity to the selected item image within the item array.

Alternatively or additionally, the engagement events may comprise at least one passive engagement event which indicates passive engagement with an item image of the display set without the user selecting the passively engaged-with item image.

The at least one passive engagement event may comprise at least one of: a zoom event, a scroll event and an item inspection event pertaining to the item array.

For example, the at least one passive engagement event may comprise one or more scroll events which denote at least one of: a scroll speed, a change in scroll speed, a scroll direction, and a change in scroll direction.

The item images may be arranged in item groups within the item array based on at least one visual feature type, such that item images with similar visual features of that visual feature type are grouped together.

Item grouping may be used in conjunction with passive engagement events.

For example, the above at least one passive engagement event may comprise a scroll event and the visual preference hypothesis is determined or updated based on a direction of the scroll event at the user interface relative to one of the item groups.

Such embodiments recognize that, when item images are grouped according to visual similarity, the direction of scroll events can be used to infer information about the user's visual preference, without necessarily requiring the user to actively engage with the item images in question.

For example, the visual preference hypothesis may be determined or updated to indicate: a preference for a visual feature of that visual feature type which matches the item group when the scroll event is directed toward that item group and/or when a scroll speed towards that item group is reduced by the user and/or when a scroll action past or through that item group is reversed (e.g. the user stops or slows a scrolling action in the vicinity of the item group, or scrolls past the group initially but then scrolls back to it), or a dislike of a visual feature of that visual feature type which matches the item group when the scroll event is directed away from that item group and/or when a scroll speed away past, through or away from that item group is increased or maintained by the user (e.g. the user continues scrolling past the item group or actively increases the scroll speed away from it).

In addition or as an alternative to item image replacement, new item images may selected dynamically in response to zoom events and/or scroll events at the user interface so as to dynamically populate previously unpopulated array positions within the item array based on the at least one visual preference hypothesis.

As another example, the at least one passive engagement event comprise may comprise an eye tracking event.

The preference hypothesis may be determined based on one or more visual features of one or more item images of the display set with which the user has not engaged.

For example, a lack of engagement with at least one item image of the display set may be detected based on at least one negative interaction event at the user interface relating to the at least one item image.

For example, the negative interaction event may be a scroll event directed away from the item image.

The display set may be additionally updated with one or more escape item images from the item database having visual features which are selected because they do not match the visual features of the engaged-with item images.

Each of the item images may be stored in an item record of the item database with associated item details, and the item details associated with each item image of the display set may be accessible via the user interface.

The visual features extracted from each item image may comprise visual features which have been extracted by applying one or more trained machine learning visual feature extractors to image data of that item image.

Alternatively or additionally, the visual features extracted from each item image may comprise one or more visual hyperparameters extracted from that item image.

Visual features of or extracted from item details or metadata associated with the item images (referred to as "predefined" visual features herein) may be used in combination with the extracted visual features.

At least one derived visual preference hypothesis may be determined based on the at least one visual preference hypothesis, by applying a transformation to at least one visual feature of the at least one visual preference hypothesis, the derived visual preference hypothesis pertaining to the transformed visual feature, and the at least one visual preference hypothesis and the derived visual preference hypothesis may be used to update the display set.

The or each visual preference hypothesis may be stored with associated information about a level of exposure, via item images of the display set, to visual features for testing that visual preference hypothesis and a level of engagement with item images having such visual features, wherein the display set is updated in dependence on the associated information.

For example, the associated information may be embodied in a confidence measure associated with the visual preference hypothesis.

This recognizes that low levels of engagement with particular features per se is not necessarily indicative of negative preference, because the user may simply not have had sufficient exposure to such features. However, a high level of exposure coupled with a relatively low level of engagement does provide reasonably strong evidence of a negative preference. Moreover, a high level of exposure coupled with a relatively high level of engagement provides reasonably strong evidence of a positive preference.

In the first aspect of this disclosure and the embodiments set out above, the visual features used as a basis for inferring visual preference comprise visual features extracted from the images themselves. However, other aspects of the present disclosure can apply the same or similar techniques with any form of visual feature (which may or may not have been extracted from the images). Accordingly, using the above terminology, the techniques may be applied with only visual features extracted through image processing (in a pre-processing step and/or in real-time), extracted visual features in combination with predefined visual features, but also with only predefined visual features, i.e. of or extracted from an associated item description or metadata.

In another aspect, an improved user interface facilitates efficient item selection based on active and/or passive engagement events (of various possible types) with an item array, providing a rich source of visual preference information.

According to one such aspect (second aspect), a computer-implemented method of determining visual preference information for a user is implemented by one or more computer processors and comprises:
  selecting a display set of item images from at least one item database;
  causing the item images of the display set to be displayed at a user interface at respective positions in an item array, wherein the item array is zoomable and scrollable to navigate the item images of the display set;
  detecting engagement events at the user interface between the user and engaged-with item images of the display set;
  updating the display set with new item images selected from the at least one item database based on visual features of the engaged-with item images and visual features of the new item images, wherein the updating comprises at least one of: replacing an existing item image of the display set with a new item image at the same array position, and populating a previously-unpopulated array position of the item array with a new item image.

In embodiments, visual features may comprise visual features extracted from the item images.

Alternatively or additionally, the visual features may comprise visual features of or extracted from item details or metadata associated with the item images.

The engagement events may comprise at least one of: an active engagement event in which the user selects an item image of the display set at the user interface, and a passive engagement event which indicates passive engagement with an item image of the display set without the user selecting the passively engaged-with item image.

The method may comprise electronically storing visual preference information for the user about the visual features of at least some of the item images with which the user has engaged.

Another such aspect (third aspect) provides a computer-implemented method of determining visual preference of a user for selecting item images from at least one item database according to the visual preference of the user, the method being implemented by one or more computer processors and comprising:
  selecting a display set of item images from the at least one item database;
  causing the item images of the display set to be displayed at a user interface;
  detecting engagement events at the user interface between the user and engaged-with item images of the display set;
  using the detected engagement events to determine a visual preference hypothesis for the user based on visual features of the engaged-with item images; and
  updating the display set with new item images selected from the at least one item database by comparing visual features of the new item images with the at least one visual preference hypothesis;
  wherein subsequent engagement events between the user and engaged-with new item images of the display set continue to be detected and used to refine the at least one visual preference hypothesis, and the display set continues to be updated as the visual preference hypothesis is refined.

The visual features of the item images may be extracted, predefined (in the above sense) or a combination of both.

In embodiments of the second and third aspects, any of the features set out above in relation to the first aspect may be implemented. It will be appreciated that all description and embodiments pertaining to extracted visual features of the first aspect apply equally to predefined visual features in the above sense in the present context.

Further aspects of this disclosure provide a computer system comprising one or more computer processors and computer memory coupled to the one or more computer processors, the one or more computer processor being configured to execute one or more computer programs held in the computer memory which, when executed, cause the one or more computer processors to carry out any of the steps disclosed herein; and one or more computer programs embodied on transitory or non-transitory computer-readable media, which are configured, when executed by one or more computers, to carry out such steps.

BRIEF DESCRIPTION OF FIGURES

For a better understanding of the present technology, and to show how embodiments of the same may be carried into effect, reference is made by way of example only to the following figures, in which.

DETAILED DESCRIPTION

Embodiments of the present technology will now be described by way of example only.

Figure 1:
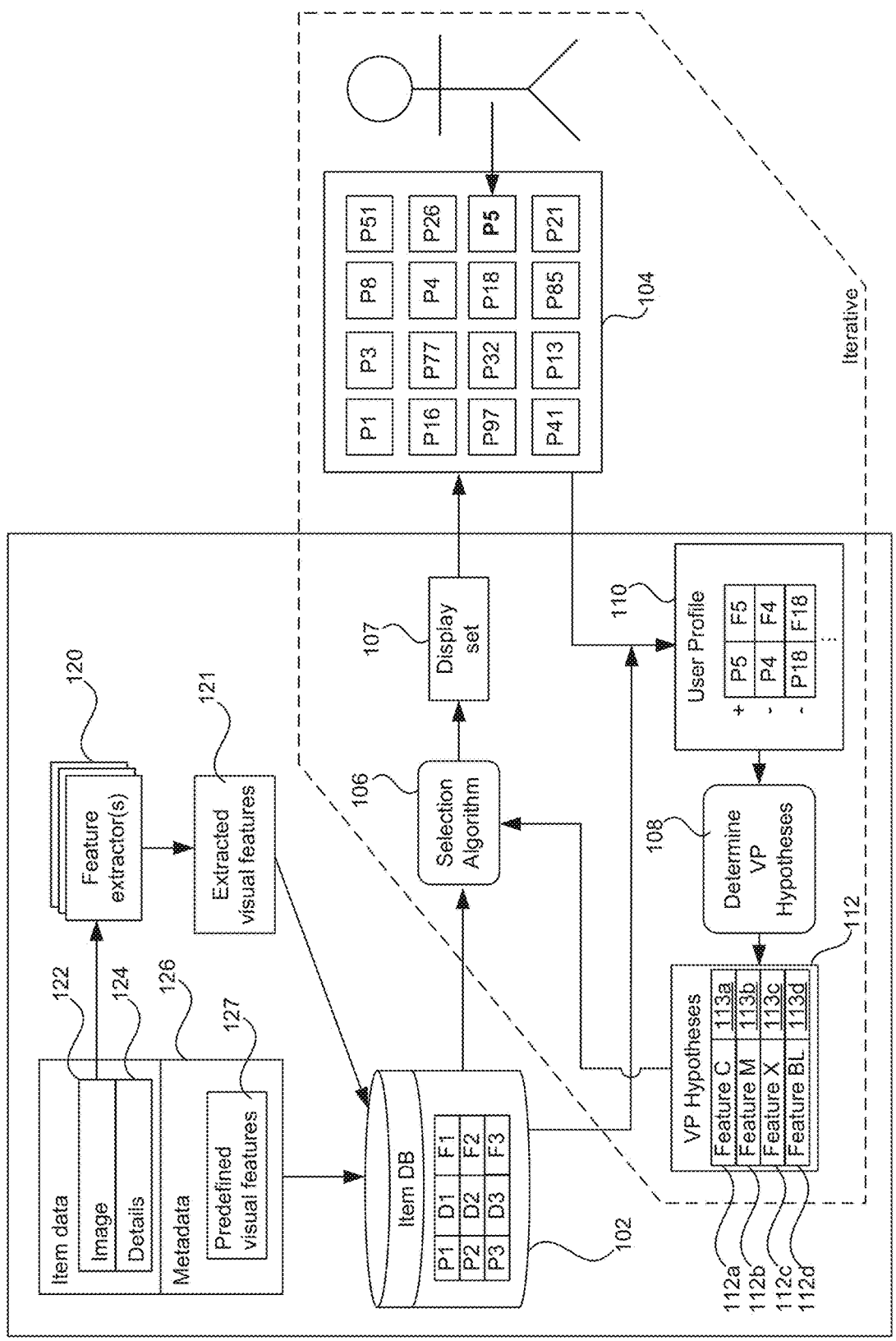
FIG. 1 shows a schematic block diagram of a computer system for selecting item images from an item database.

With reference to FIG. 1, there is first provided an overview of certain components of a system 100 for selecting item records from an item database (DB) 102 according to a user's inferred visual preference.

FIG. 1 shows a schematic block diagram of the system 100. A user interface (UI) 104 controlled by the system 100 is shown to be accessible to a user. The UI 104 comprises at least one display via which item images may be displayed to the user, and at least one input device (such as a touchscreen, mouse, trackpad, gesture recognition component etc.) via which the user may select or otherwise engage or interact with displayed item images.

Over time, the system 100 is able to infer visual preference information for the user, use that visual preference information to select appropriate item images from the item DB 102 for displaying to the user based on corresponding visual item features, and iteratively refine the visual preference information and update the displayed item images as the user engages with the displayed item images via the UI 104. The inferred visual preference information is captured in the form of one or more visual preference hypotheses 112.

Visual item features may be referred to simply as visual features or item features for conciseness.

Although not shown explicitly in FIG. 1, the system 100 is a computer system comprising one or more computer processors (such as CPUs, GPUs or other accelerator processors etc.) programmed to carry out the function of the system 100 described herein. In particular, the system 100 is configured to implement a selection algorithm 106 for selecting item images, a visual preference inference algorithm 108 for determining one or more visual preference hypotheses 112 for the user and one or more feature extractors 120 for extracting visual features from item images. The selection algorithm 106, visual preference inference algorithm 108 and feature extractors 120 are software components implemented according to program instructions stored in computer memory of the system 100 and executed on the one or more computer processors of the system 100.

The item DB 102 holds item records, i.e. records of visual items. Three such item records are shown and labelled P1, P2 and P3 respectively. However, it will be appreciated that the item DB 102 may hold a much larger number of item records such that navigating the item DB 102 is challenging. Each item record P1, P2, P3 contains item data (labelled D1, D2 and D3 respectively) together with a set of visual item features (labelled F1, F2 and F3 respectively). The set of visual item features F1, F2, F3 of each item record P1, P2, P3 comprises extracted visual features 121, as extracted by the one or more feature extractors 120 from at least one item image 122 of that item record. That is, by applying automated feature extraction to image data of the item image 124. Examples of extracted visual item features are described below. The automated feature extraction applied by the feature extractor(s) 120 is a form of "computer vision" analysis. Such computer vision analysis is applied to all item records in the item DB 102, as described in further detail below.

The set of visual item features F1, F2, F3 may also comprise one or more predefined visual item features 127 (i.e. visual features of or extracted from an associated item description or associated metadata, as opposed to features extracted from the image itself though image processing). As depicted schematically in FIG. 1, the item data of each item record comprises the item image 122 together with associated item details 124. The item data 124 is also associated with item metadata 126, which includes the predefined visual item features 127. The item image 122 is an image of an item to which the item record relates, in which extractable visual features of the item are captured. Both the item details 124 and the item metadata 126 are data about the item. However, whereas the item details 124 may be rendered accessible to the user who is browsing that item, the item metadata 126 is generally only used within the computer system 100. It is noted that, although the predefined item features 127 are shown as part of the item metadata 126, one of more of the predefined visual features 127 may in fact form part of the item details 124 (in the sense that those features may be accessible to a user who is browsing that item). The item details 124 may, for example, be accessible via an item information page, which the user can navigate to via the UI 104.

Examples of predefined features for garments or similar such items include as sleeve length, collar type etc. or affinity to known fashion styles (among many others).

For conciseness, the following description may refer to visual features of an item image. Unless otherwise indicated, this means the visual item features extracted from that item image together with any predefined visual features 127 associated with that item image in the applicable item record. Such visual item features, individually and in combination, provide a basis on which the system 100 can understand and thus apply analytical reasoning to items (products) as well as users' visual preferences.

The above components cooperate to help users discover the most visually pleasing items amongst a large number of items, according to their individual tastes and preferences. The system 100 is designed so as to:
  (1) expose the user to as many visually pleasing items as possible;
  (2) maximize the collection of user preference information to enable (1);
  (3) repeat (1) and (2) to refine the selection of items displayed to match the user's preference accurately,
  (4) allow the user to re-define their stylistic preferences, and refine their search when they change their mind (e.g. discover new styles they like, but did not know of previously) during an item browsing session; and
  (5) reduce the cognitive load placed on the user in an item browsing session.

The selection algorithm 106 may be referred to synonymously herein as a recommendation engine. The recommendation engine is a form of artificial intelligence (AI), noting that the term AI covers a range of software architectures including, for example, machine learning but also rules-based systems.

In contrast to a conventional recommendation engine, the recommendation engine 106 is not designed to exclusively deliver maximally pleasing options for the user at each round of recommendation. Rather, the recommendation algorithm 106 can deliberately expose the user to items that might not be most pleasing to the user but would contribute the most information about the user to allow the recommendation engine 106 to make better recommendations in the future.

The recommendation engine 106 does not require the user to enter the search query or formulate specific search criteria. Instead these are inferred from interaction behaviour. The user does not even need to have a well-defined search goal in mind (not even a hard-to-describe mental image)—the system 100 interactively tests the user for conscious and subconscious preferences to direct him or her towards the most visually pleasing items.

The system can be characterized as a tool for users to communicate their visual style preferences without using words, but rather by selecting images in what is referred to herein as a "Visual Language of Search".

Further details of the above components will now be described in the enumerated sections that follow.

1. Computer Vision Analysis of Item Images

Figure 2:
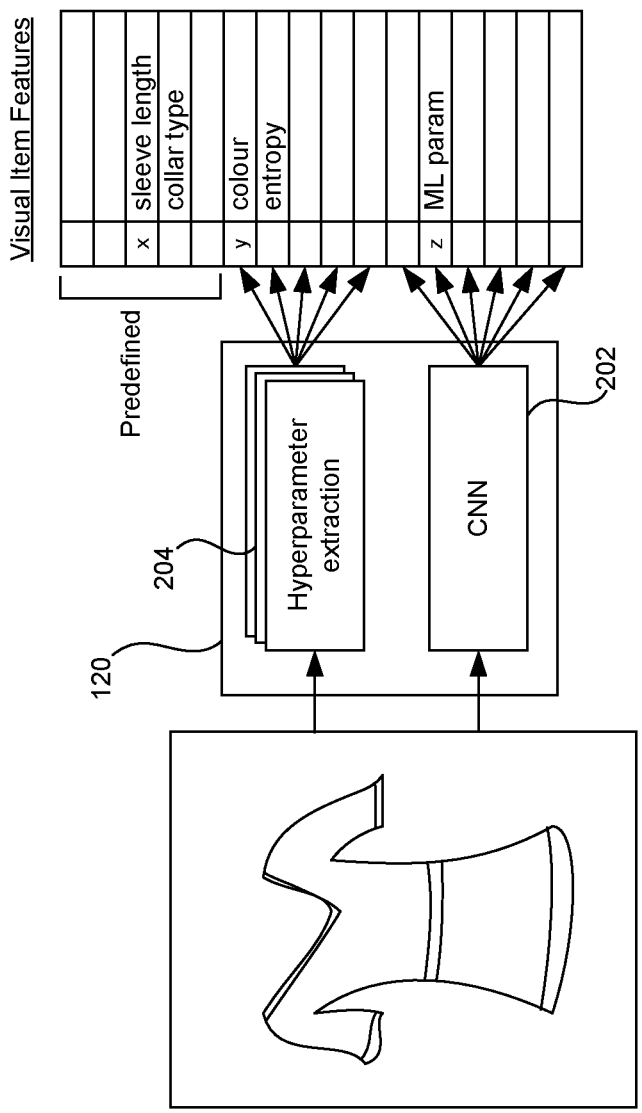
FIG. 2 shows a schematic block diagram of an example set of feature extractors for extracting visual features from an item image.

FIG. 2 shows an example set of such feature extractors 120 which may be used to extract visual item features from an item image.

One example of a suitable feature extractor is a convolutional neural network (CNN) 202 or other neural network (NN) feature extractor which has been trained on a suitable set of training images. NN feature extractors are known per se therefore further details are not described herein. A NN feature extractor analyses item images to extract a large number of features characterizing the visual quality of the products. That information is typically encoded in the form of a feature vector or feature map.

Features extracted by a NN feature extractor, or another form of machine learning (ML) feature extractor, may be in the form of machine-understandable visual parameters (referred to as ML parameters for conciseness), such as shape of edges at smaller or larger scale, visual patterns within the items etc—typically a thousand or more qualities defined by the neural network and usually lacking a human-defined counterpart. These may be used to determine visual similarity between item images based on a numerical comparison of corresponding ML parameters between the item images.

In addition, the extracted visual item features comprise one or more visual hyperparameters, such as color, entropy etc. Such visual hyperparameters are extracted by at least one hyperparameter extraction component 204. The hyperparameter extraction component 204 may also be a neural network or other form of ML component, or it may be implemented as a classical (non-ML) image processing algorithm.

A visual hyperparameter is a characterization of an overall aspect of an item's visual appearance. Other examples of visual hyperparameter include an overall colour hue or colour saturation, an indication of whether or not the item is patterned (and/or an extent to which it is patterned), darkness/lightness, relative size of the any features; overall entropy etc.

Other examples of visual features, which are not visual hyperparameters (and may be extracted or predefined) include the presence or absence of specific components such as metal studs, zips etc. and/or the number, prominence etc. of such components (e.g. a particular hyperparameter may denote the presence of several prominent zips), and other measures of overall style such as fabric, fit (e.g. slim vs regular vs loose) etc.

As described in further detail below, the item features extracted by the feature extractor(s) 120 are used in combination with any predefined visual features 127 as a basis for making individual item recommendations to the user.

Figure 3:
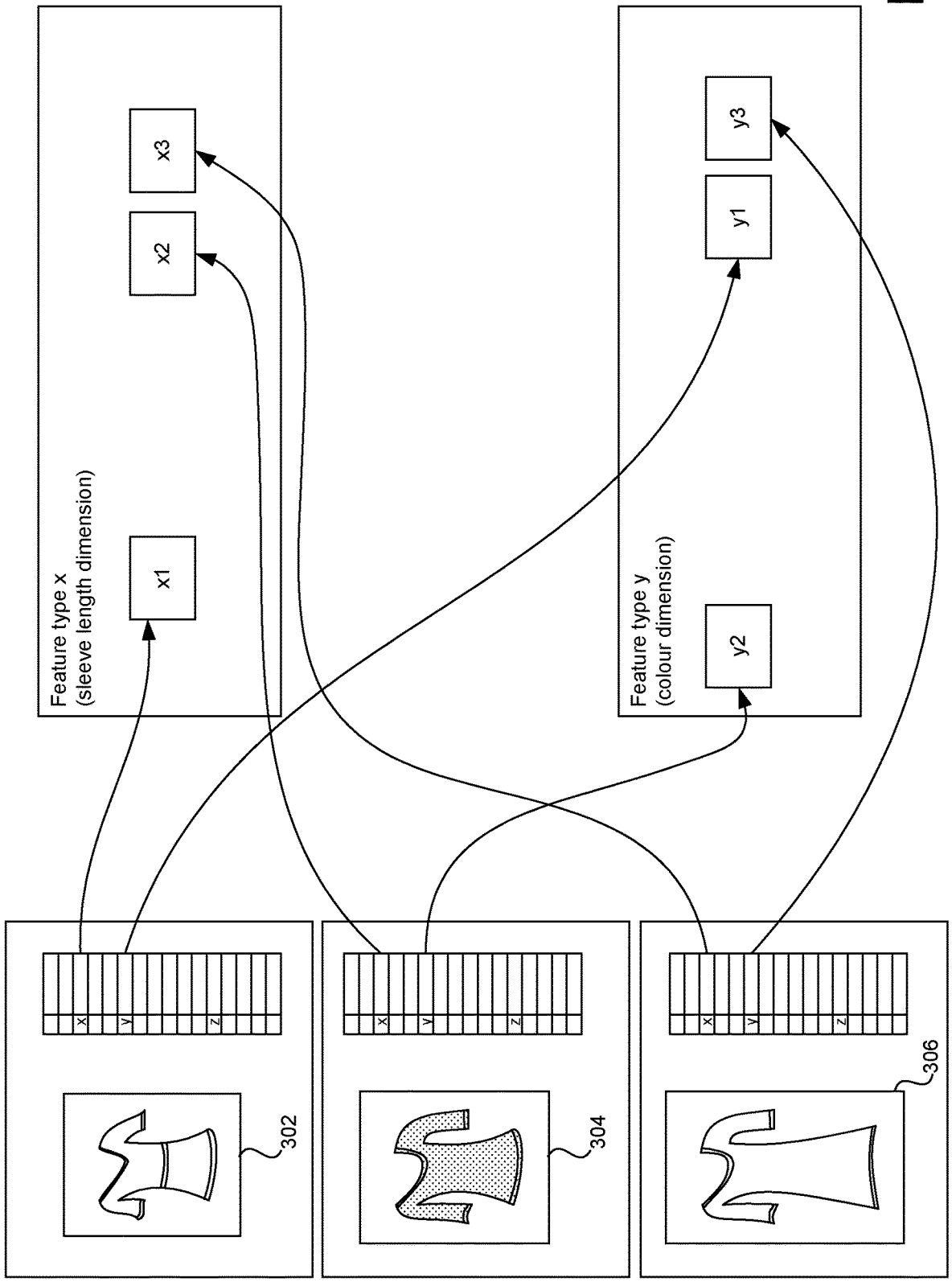
FIG. 3 schematically illustrates examples of different visual item feature types, which correspond to respective dimensions of a multidimensional feature space.

With reference to FIG. 3, the full set of visual features (predefined and extracted) are defined in a multidimensional feature space. Each dimension of the feature space corresponds to a visual feature type (such as sleeve length, colour or a particular ML parameter). The value of each feature dimension for given image constitutes a visual feature of the corresponding type according to the terminology used herein. Item features of an item image are represented numerically as a vector point within the multidimensional feature space, such that geometric relationships between different vector points mirror visual relationships between item images represented by those points.

By way of example, FIG. 3 shows first, second and third images 302, 304 and 306. Dimension x of the feature space corresponds, in this example, to a predefined "sleeve length" parameter, feature y to an extracted "colour" hyperparameter (e.g. a dimension in a defined colour space) and feature z to a specific ML parameter (which may lack a straightforward human-interpretable counterpart) as extracted by the ML feature extractor 202.

The values $x_1$, $x_2$ and $x_3$ of dimension x for the first, second and third images 302, 304, 306 indicate, respectively, sleeve lengths of respective garments visible in those images. As depicted schematically in FIG. 3, the garments of the second and third images 304, 306 have similar and relatively long sleeve lengths, whereas the garment of the first image 302 has relatively short sleeves. Hence, $x_2$ and $x_3$ are relatively near to each other in dimension x of the feature space, as compared with $x_1$. Similarly, the values $y_1$ and $y_3$ of dimension y (colour) for the first and third images 302, 306 are similar because the garments visible in those images are similarly coloured, in contrast to the value $y_2$ of dimension y for the second image 304 which depicts a different coloured garment.

Visuals similarity is similarly captured in geometric relationship between features in other dimensions, including those which correspond to ML parameters.

Figure 4:
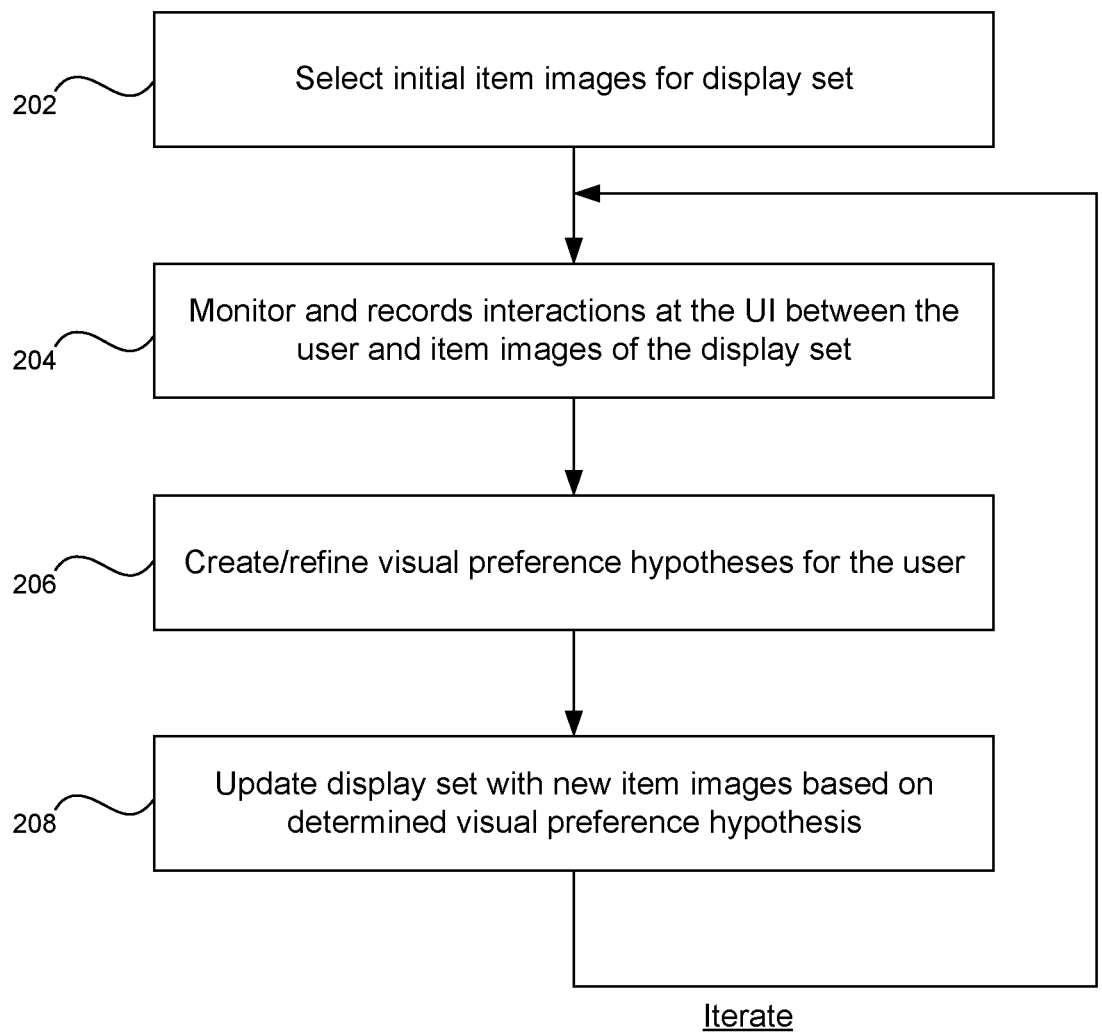
FIG. 4 shows a flow chart for a computer-implemented method of iteratively refining a visual preference hypothesis based on interactions between a user and item images of a display set, and updating the display set as the visual preference hypothesis is refined.

FIG. 4 shows a high-level flow chart for an iterative method of selecting item images from the item DB 102 for displaying to the user.

Within the system 100, a "display set" 107 is defined. The display set 107 contains item images selected by the recommendation engine 106 from the item database 102 for displaying to the user at the UI 104. Note that, not every item image in the display set 107 is necessarily displayed simultaneously at the UI 104, however the user has the option of navigating to any of the item images in the display set 107 via the UI 108.

At step 402, the display set 107 is created initially by the recommendation engine 106 selecting a number of initial item images from the item DB 102. At this point, it is assumed that no visual preference information is known for the user. Accordingly, the initial item images may be selected at random or in a strategic manner based on the visual features of the item images so as to maximize the user's exposure to as many different visual features or combinations of visual features as possible. Alternatively, if a certain amount of information is already known about the user's visual preferences (e.g. a basic level of visual preference information may be explicitly provided by the user), this may be used to assist the selection of the initial item images.

The user is thus free to inspect and otherwise interact with item images of the display set 107 via the UI 104.

As the user interacts with particular item images of the display set, those interactions are monitored and recorded (404) in a user profile denoted by reference numeral 110 in FIG. 1.

Interactions can include both positive interactions ("engagement events"), i.e. which indicate a preference for a particular item image as well as negative interactions, i.e. which indicate that the user actively dislikes' a particular item image. Engagement events can include both active engagement events, in which a user specifically selects a particular item image, as well as passive engagement events which indicate a preference for a particular item image without the user actively selecting it. Examples of engagement events and other forms of interaction are described later.

The interactions recorded in the user profile 110 are used, by the visual preference inference algorithm 108, to determine (406) the visual preference hypotheses 112 for the user. Once determined, the visual preference hypotheses 108 can, in turn, be used to update (408) the display set with new item images. This commences an ongoing iterative phase of the method, in which the visual preference hypotheses 112 are refined as the user continues to interact with the updated display set 107, and the display set 107 continues to be updated as the visual preference hypotheses 112 are refined.

2. Item Array Layout

Figure 5:
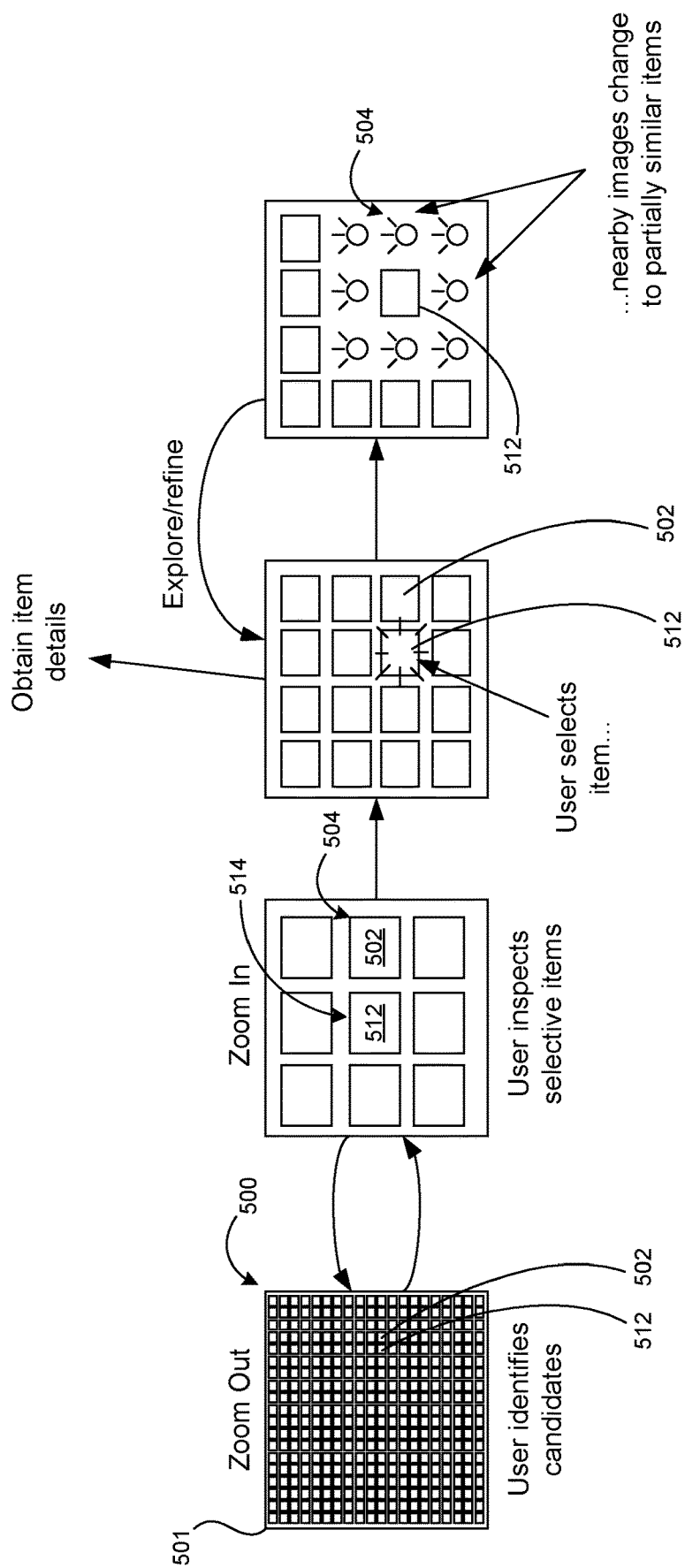
FIG. 5 schematically illustrates how item images may be rendered at a user interface in a navigable item array to allow a user to engage with the item images within the item array.

FIG. 5 shows a highly schematic depiction of a dynamic "item array" 500 in which item images of the display set 107 are displayed within an available display area 501 of the UI 104. For example, at least one item browsing page may be provided within the available display area 501, within which the item array 501 is displayed.

The item images are displayed at respective array positions within the item array 500. That is, the item images of the display set 107 are displayed in a uniform arrangement within the available display area 501 at defined array positions. By way of example, two of the item images in the item array are denoted by reference numerals 502 and 512 respectively and are displayed at array positions 504 and 514 within the item array 500 respectively.

The item array 500 is both scrollable, i.e. the user can scroll through the item array to render different parts of the item array 500 visible (and hence view different item images which currently form part of the display set 107), and zoomable, i.e. the user can zoom in (resp. out) to show a lesser (resp. greater) number of item images within larger (resp. smaller) respective portions of the available display area.

FIG. 5 shows additional details of an example item browsing session, which are described in due course.

In this example, the item array 500 takes the form of a very large two-dimensional grid that can be scrolled via the UI 104 both horizontally and vertically. The item browsing page supports a wide range of zoom levels, from hundreds of very small images per page up to few very detailed images per page.

For example, a "pinch zoom" gesture may allow user of a touchscreen device to effortlessly zoom in on an area of interest in the grid. The products are arranged in the grid 500 so that a large amount of information on user preference can be captured by following the user's actions on the grid 500. This can include areas high on specific parameters, or mixture of parameters at different zoom levels. More generally, zoom events can be instagated by a pinch gesture or any other relevant gesture, such as mouse wheel movement, virtual reality (VR) or game controller buttons etc.

On lower zoom levels, many more products than in typical navigation can be shown at once. This exposes the user to more products and thus, on average, a greater number of visually pleasing products. As many stylistic decisions can be taken on low detailed view, this allows the user to quickly make an initial selection from large variety of stylistic options. At the same time, the user can further refine interest by zooming in on products that are potentially relevant. The low-detail zoom levels allow the user to easily travel between different fashion dimensions, such as category, style, color, shape etc.

This is in contrast to existing item browsing layouts which expose users to a limited number of products (failing to allow the user to see other products that may match their style interests), often already filtered by a functional category (failing to expose the user to products outside the chosen category).

Using zoomable grid navigation, the user generates large amount of preference data quickly via interaction events at the user interface 104. Micro-actions, such as—but not limited to—a relatively longer examination of a particular area (inspection event), zooming in on a particular portion or he item array (zoom event), how quickly did she zoom out again. These are all examples of passive interaction events, which may be monitored together with active engagement events (such as selecting or liking a product) to understand user preferences.

One form of passive engagement event is an item inspection event, which may be defined relative to other events. A user may be considered to inspect an item for a duration between two other navigation events (e.g. zoom or scroll events), and that may be referred to herein as an interaction event of that duration.

Specific examples of passive engagement include a user zooming in to a specific product or product group, indicating positive interest (and zooming out to indicate disinterest) or the user scrolling towards or away from any product or product groups. The speed of the scroll event may be taken into account, for example when the user stops or slows the scrolling motion to observe a product or group of products (hesitating if such a product/group is of interest, or not); or a faster scroll could indicate a lack of interest in group of products. It will be appreciated that these examples are not exhaustive, and that other forms of passive engagement with the item array may be used to infer visual preference.

Another example of a passive engagement event is an eye tracking event, which can be detected using one or more eye tracking sensors (such as image capture device(s)).

Each area of the grid displays products with known extracted features 121, hence as the user interacts with the item images of the display set 107, the system 100 can start to infer visual preference information for the user, in the form of the visual preference hypotheses 112.

Whilst the grid of products displayed initially may appear to include random set of products, these are preferably chosen strategically by the recommendation engine 108 to maximize exposure to a number of styles, which in turn helps the user to find the closest visual matches to their desired product styles.

The grid 500 can also be arranged into areas (item groups) of stylistically similar products, based on category, color, style or other important feature dimension. This functions as a navigation aid to the user and allows to preferences to be inferred from scrolling actions.

In other words, item images of the display set 107 may be grouped into item groups, within the item array 500, according to one or more visual feature types (dimensions), so as to group together item images with similar visual features of that type. With item images grouped in this way, user preference can start to be inferred based on scroll event direction. For example, if item events are grouped according to a particular type of style hyperparameter, when a user scrolls toward a particular item group, this may indicate a preference for the corresponding style. Conversely, if a user scrolls away from a particular item group, this may indicate a dislike of the corresponding style.

Considering this in terms of the feature space, by grouping item images together based on a particular dimension(s) of the feature space, such that each item group corresponds to a particular subspace of the feature space, scroll events can be mapped to subspaces of the feature space based on directionality of the scroll event, and therefore used as a basis for "dividing up" the feature space according to a user's hypothesised individual visual preferences.

As the system 100 becomes more confident in the visual preference hypotheses 112, the grid 500 will be mostly populated with items the recommendation engine 106 is confident the user will like. However, it may continue to populate the grid with a number of "escape items" that represent a different style and can be used to indicate saturation with current choice and desire to explore radically different options. Escape items are strategically chosen on the basis that they have visual features which do not match images the user has engaged with, in order to provide avenues for exploring quite different visual preference hypotheses.

Each of the visual preference hypotheses 112 imposes a biasing effect on the selection algorithm 106. That is, each visual preference hypothesis has the effect of biasing the selection of item images toward items images suitable for testing that hypotheses, i.e. so as to increase the likelihood of such images being selected for the display set 107. The strength of the biasing effect imposed by a given hypothesis may be increased as the confidence in that hypothesis grows, i.e. as the confidence increases, item images which match that visual preference hypothesis are increasing likely to be selected for the display set 107.

3. Interactive Funnel of Interest

Upon clicking or otherwise engaging with a product image at the UI 104, a number of product images surrounding it will be changed to new product images that:
  match more closely the user's stylistic preference, by analyzing the user's stylistic preference from their action and micro-actions (passive and active) at the zoomable and scrollable grid 500;
  are selected to display a variation of products that help the user further refine their stylistic preference—i.e. to provide additional insight into user preferences.

This process can be done repeatedly to either refine the selection around a certain visual style, by clicking on mostly similar items, or to expand possibilities and explore by clicking on items along a certain visual direction.

This provides what is referred to herein as an "interactive funnel of interest". The interactive funnel of interest allows the system to actively infer user preferences. When a user clicks on (or otherwise selects) an item image, it typically expresses likability. However, the user may not like the engaged-with item(s) in its entirety but just some of its features. The item may also be in the desired visual direction but not far enough (or too far). A single click on an item does not tell which features the user liked. With the interactive funnel of interest, desirability of different features of the product can be tested by displaying products emphasizing one or another feature of the liked product and observing further engagements.

A variant of the system 100 augments the zoomable grid layout 500 with processes from the interactive funnel of interest, in order to provide a dynamic map layout. In this variant, when the user scrolls the map, newly visible portions of the map are dynamically generated based on the information gathered on user intent and preferences so far, i.e. based on the visual preference hypotheses 112. The data can include micro-actions such as direction of ongoing scroll (when items are placed on the map not randomly but based on their stylistic or visual features), zoom-in areas, and others; or actions like previously collected item clicks. Items displayed in the newly generated portions are chosen to be either most pleasing or most informative. Only previously unseen areas are dynamically generated while the areas that the user has seen at sufficiently detailed zoom level will stay unchanged. Dynamic map layout can also have the click-based interactive funnel of interest.

Returning to FIG. 5, an example of a possible item browsing session will now be described.

Each item image of the display set 107 is associated with the array position at which it is to be displayed in the item array 500, and the item array 500 is updated (at least in part) by removing item images from the display set 107 and replacing them with new item images at the array positions of the removed item images.

To illustrate how the user may choose navigate the item array 500, FIG. 5 shows the item array 500 in a sequence of states, denoted by numbered circles 1-4.

In state 1, the item array 500 is rendered at a relatively low zoom level. That is, with a large number of item images displayed in relatively small portions of the available display area 501. This is useful for identifying candidate item images within the item array 500, which the user can the zoom in on.

In state 2, the user has zoomed in on item image 512 in order to more closely inspect it.

In state 3, the user has just selected item image 512, causing nearby item images to change (i.e. be replaced with new item images) in response (state 4). This includes item image 502, which is removed from array position 504 and replaced with a new item image at the same array position 504.

In this particular example, all of the item images at array positions surrounding (i.e. immediately adjacent) to the array position 514 of the selected image 512 are changed. More generally, item images may be selected for replacement based on their array positions relative to the array position of the selected item.

Applying the iterative method of FIG. 4, the selection of the item image 514 may cause at least one visual preference hypothesis 112 to be newly created and/or an existing visual preference 108 to be updated. The visual preference hypothesis is created or updated based on one or more visual features of the selected image 512, as described later.

4. Hypotheses and Recommendations

A core function of the selection algorithm 106 is the selection of new item images from the item DB 102 in response to passive and active engagement events at the UI 104. Such new images may be selected to replace existing item images, or be selected to populate the item array dynamically as the user navigates to previously unseen array positions.

Continuing the example of FIG. 5, the new item images which replace the surrounding item images (including the image 502) are selected by comparing their visual features with the newly created or updated visual preference hypotheses 112. Hence, that selection takes into account relationships between the visual features of the item image 512 which the user has just engaged with and the visual features of the new item images. This provides a highly engaging experience for the user.

The visual preference extraction algorithm 108 is made up of a set of component algorithms that infer user preferences from the stream of actions and micro-actions during an item browsing session at the UI 104. These, in turn, may be used by the recommendation engine 106 to determine an optimal layout of products to be shown to the user—both with the intention of selecting items it thinks the user will visually prefer (i.e. which match a given visual preference hypothesis), as well for refining understanding of user preferences (i.e. to allow existing visual preference hypotheses to be refined or new such hypotheses to be explored, even if that means showing a few item images for which there is no direct indication of preference in the user's action to date).

The main source of user preferences is the set of visual item features extracted from the item images and user's behaviour towards these products, though as noted predefined visual features may also be taken into account. When a user clicks on an item image with a certain feature set (e.g. Dress, red, Gucci, country-style, bell-shaped etc.), it strengthens hypothesized user preference towards these features.

A sequence of interactions over time may taken into account—for example, persistent selection of a certain feature type (clicking dress; dress; dress) can indicate strong preference whereas intermittent selection (clicking dress; trousers; dress) can indicate indifference to that dimension of the feature space (in the example: category).

Negative information will also be taken into account—when user is shown items with certain features and chooses to ignore these (by not selecting it, scrolling away, zooming out etc), it weakens hypothesized preference towards these features or leads to negative preference. Many different such criteria can be used, and the above is only intended to serve as examples of the general principle that user's visual preferences will be inferred from her sequence of actions towards products with known visual features (both extracted and predefined).

Figure 6:
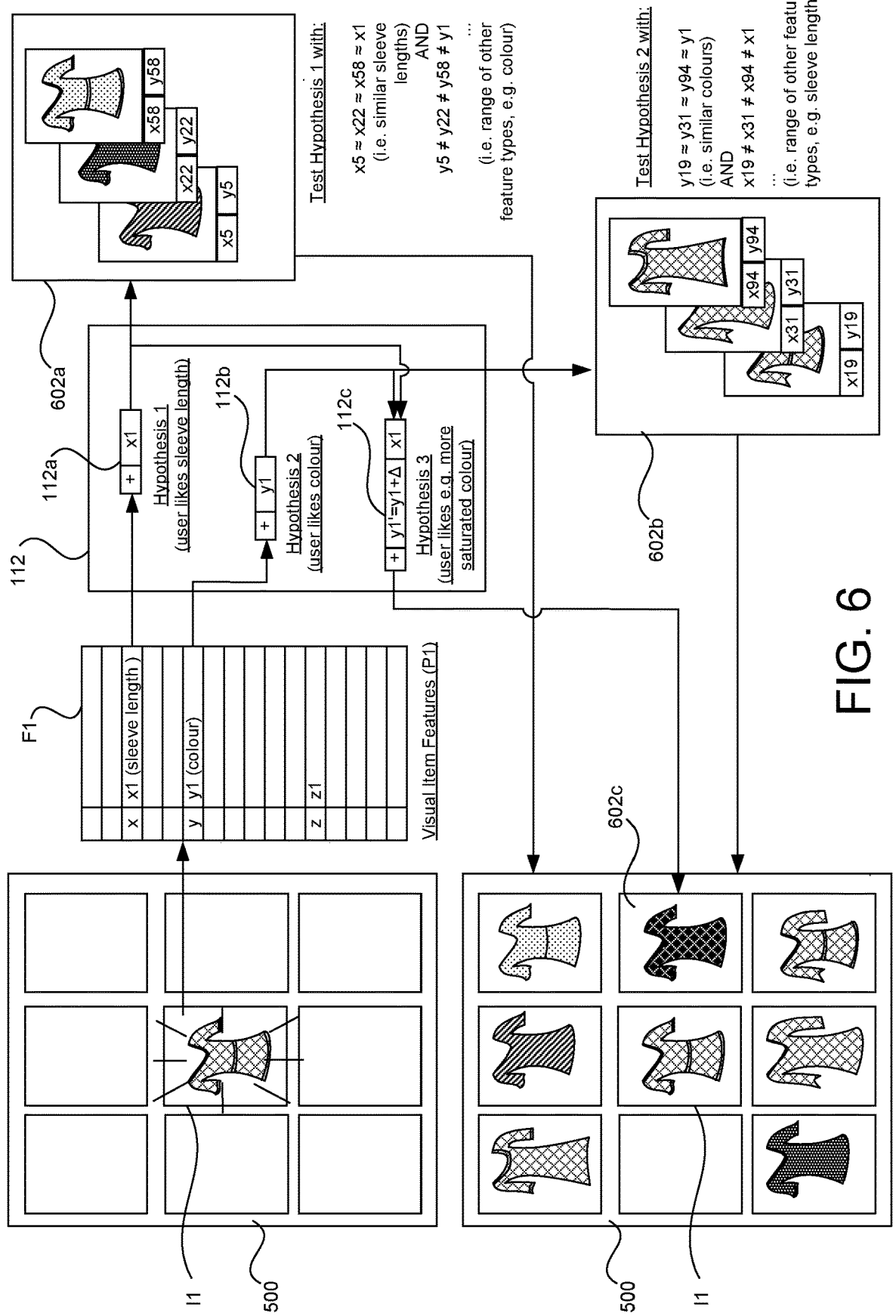
FIG. 6 shows a simplified example of how visual preference hypotheses may be created, tested and refined.

By way of further illustration, FIG. 6 shows an example of a set of visual preference hypotheses 112 which may be created and tested in response to a user engaging with an item image.

FIG. 6 shows the item array 500 at a zoom level at which nine images (3×3) are visible. An item image I1 from item record P1 is shown at a central array position. As described previously, the item image I1 is associated in the item record P1 with a set of visual item features F1. When the user selects item image I1 from within the array, this indicates a possible preference for one or more visual features of the item image F1. However, at this point, the system 100 does not know which of those features (or which combination of those features) the user has a preference for.

Purely by way of example, the hypothesis extraction algorithm 108 is shown to have created first, second and third visual preference hypotheses 112a, 112b and 112c in response to the selection of the item image I1.

The first visual preference hypothesis 112a pertains to dimension x of the feature space, which in this example corresponds to a "sleeve length" visual feature type. The first hypothesis 112a speculates that it is the sleeve length of item I1 that the user likes. In order to test the first hypothesis 112a, the recommendation engine 106 selects a first subset of new item images 602a having similar sleeve lengths, i.e. similar values in dimension x of the feature space, but which exhibit variation in one or more other visual feature types, i.e. in one or more other dimensions of the feature space. This particular example considers a colour component (dimension y), such as colour saturation, as a dimension in which the item images of the first subset 602a exhibit variation, in order to test the first hypothesis 112a. In this example, the item images of the first subset 602 are of garments with similar sleeve lengths but in different colours (or, more specifically, different colour saturation levels).

The value of dimension x for the item image I1 is denoted by x1 and the value of dimension y by y1. The first subset of item images 602a are shown to have values x5, x22 and x58 in dimension x of the feature space, which are all similar to the value x1. The values of dimension y are denoted y5, y22, and y58 and those images are chosen in part because those values significantly different from each other and from y1 in order to effectively test the first hypothesis 112a.

The second visual preference hypothesis 112b pertains to dimension y of the feature space, i.e. colour saturation in this example. Hence, a second subset of item images 602b is selected for testing the second hypothesis 112b on the basis that those images have similar colour saturations, i.e. similar values in dimension y of the feature space, but exhibit variation in one or more dimensions other than y; in this example, they exhibit variation in at least dimension x of the feature space (sleeve length). This materialises in the selection of item images which have different sleeve lengths but similar colours for the second subset 602b.

The values of dimension x for the second item image subset 602b are denoted by x19, x31 and x94. The values in dimension y are denoted y19, y31 and y94. The feature y1 of item image I1 forms the basis of the second hypothesis 112b, and consequentially the second test images 102b are selected so that the values y19, y31 and y94 are all similar to y1, but the values x19, x31 and x94 differ from each other and from x1.

The third hypothesis 112c is, by contrast, derived from the first and second hypotheses 112a, 112b. The intention of the derived hypothesis 112c is to test whether, in fact, the user might prefer a more "extreme" colour of an otherwise similar item. For example, a more saturated version of the colour of the selected item image I1, but otherwise similar.

In this case, a transformation is applied to the feature y1 in dimension y of the second hypothesis 108b in order to obtain a transformed feature y1'=y1+Δ (i.e. increasing the level of saturation) which forms the basis of the third hypothesis 108c, along with x1 which is incorporated into the third hypothesis 108c unchanged (such that the cumulative effect is to show garments with similar sleeve lengths but in more saturated colours).

As shown at the bottom left of FIG. 6, the array positions surrounding the central array position of the selected image y1 are updated so as to replace the existing images with the new item images 602 and 602b. In addition, a third new item image 602c is shown which is selected for testing the third hypothesis 108c, as a garment with similar sleeve length x1 but more extreme colour saturation y1'.

Now that the item array 500 contains a range of images suitable for testing the visual preference hypotheses, as the user continues to interact with the item array 500, the visual preference hypotheses can be refined based on the user's response to the new item images 602a-602c. For example, should the user select an image from the first subset 602a but not he second subset 602b, that will generally have the effect of increasing the confidence assigned to the first hypothesis 108a relative to the second hypothesis 108b. This, in turn, may strengthen the biasing effect of the first hypothesis 108a relative to the second hypothesis 108b, which in turn increases the relative likelihood of item images being selected so as to match the first hypothesis 108a.

As will be appreciated, this is a highly simplified exampled intended to aid understanding of certain principles underlying the creation, testing and refinement of visual preference hypotheses. In practice, those same principles may, for example, be extended to a greater number of hypotheses, more complex hypotheses (e.g. pertaining to combination of multiple visual feature types), and to take into account a potentially much greater number of engagement events (passive and active) as well as negative interaction events. Moreover, whilst this example considered a "positive" hypothesis i.e. about visual item features which the user is hypothesised to have a preference for, "negative" and "neutral" hypotheses are equally viable. A negative hypothesis supposes that the user has an active dislike of a certain visual feature or a certain visual feature combination. A neutral visual preference hypothesis supposes a user is neutral about, i.e. neither likes nor dislikes, a certain visual feature type of types.

5. Hypothesis Confidence

When it comes to testing a visual preference hypothesis, both engagement and exposure are pertinent.

If the user has been exposed to a large number of item images which are suitable for testing a given visual preference hypothesis, and has responded to those item images in a manner consistent with that visual preference hypothesis, then the system 100 can be relatively confident that the visual preference hypothesis is correct.

On the other hand, if the user has been exposed to a large number of such item images, but has not responded to them in a manner consistent with the visual preference hypothesis, the system 100 can be reasonably confident that the visual preference hypothesis is not correct.

When the user has only been exposed to a limited number of item images suitable for testing a given visual preference hypothesis, the system 100 will be less sure either way.

Confidence may for example be captured in a confidence measure assigned to a given visual preference hypothesis, which takes into account both relevant exposure and relevant engagement.

With reference to FIG. 1, by way of example, four individual visual preference hypotheses are shown and denoted by reference numerals 112a to 112d respectively. In the present example, each of those individual visual preference hypotheses pertains to a single visual feature but it will be appreciated that a visual preference hypothesis could also pertain to e.g. a combination of multiple visual features. Each individual visual preference hypothesis 113a to 113d is shown to comprise an assigned confidence measure denoted by reference numerals 113a to 113d respectively.

Figure 10:
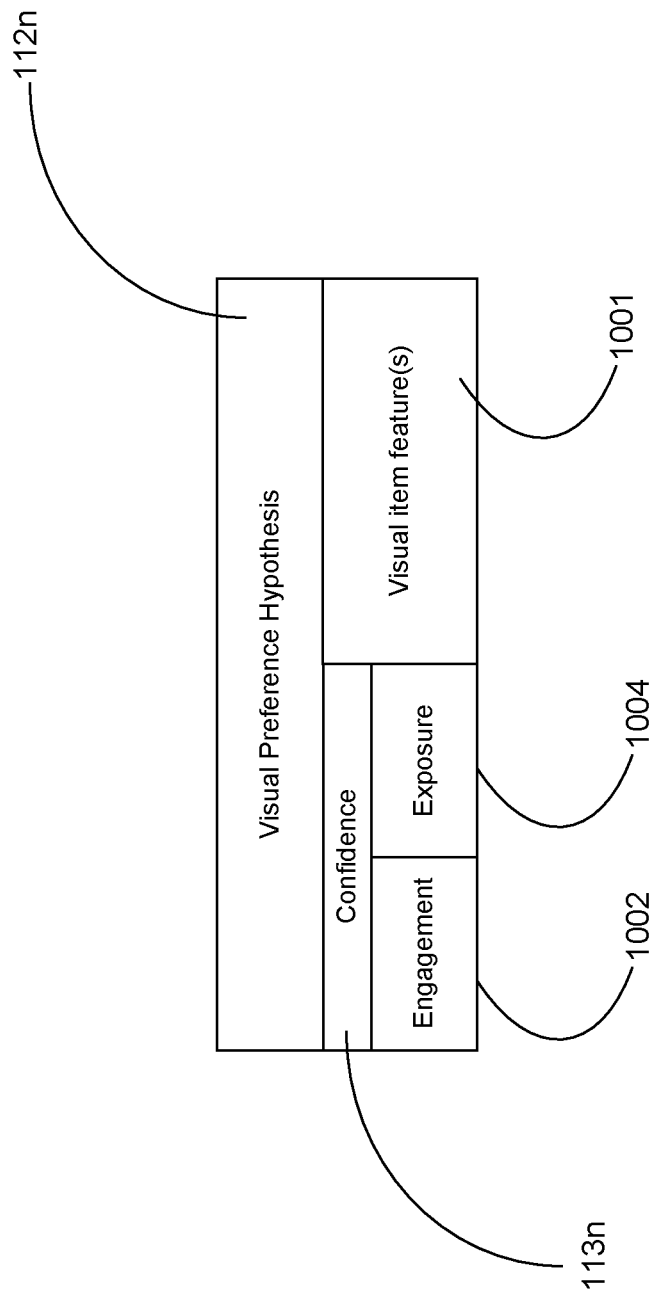
FIG. 10 shows a schematic block diagram of an individual visual preference hypothesis.

FIG. 10 shows a schematic block diagram of a visual preference hypothesis 112n pertaining to one or more visual item features 1001. The visual preference hypothesis 112 is shown to comprise an assigned confidence measure 113n, which in turn is shown to comprise an engagement component 1002 and an exposure component 1004.

The exposure component 1004 indicates a level of exposure to item images for testing the visual preference hypothesis 112n (e.g. the total number of such item images the user has been exposed to). Following the example of FIG. 6, these could for example be item images with visual feature(s) which match the one or more visual item features 1001 of the visual preference hypothesis 112n, but exhibit variation in other visual feature type(s).

The engagement component 1002 indicates a level of engagement with those images (e.g. the number of such item images the user has selected or otherwise engaged with at the UI 104). Once the level of exposure reaches an exposure threshold, the visual preference hypothesis 112 may, for example, be removed or invalidated if the level of engagement has not also reached an engagement threshold by that point.

Alternatively, the visual preference may not be removed or invalidated even when the confidence is low. As noted, the strength of the biasing effect that the visual preference hypothesis 112n has on the item image selection process may increase as the system 100 becomes more confident in that hypothesis. In the present example, the strength of the biasing effect may thus depend on both the engagement level and the exposure level, and increase as both the engagement level and the exposure level increase (up to a certain point), but decrease as the engagement level increases without increasing the engagement level (possibly all the way to zero).

6 Example Item Arrays

Figure 7:
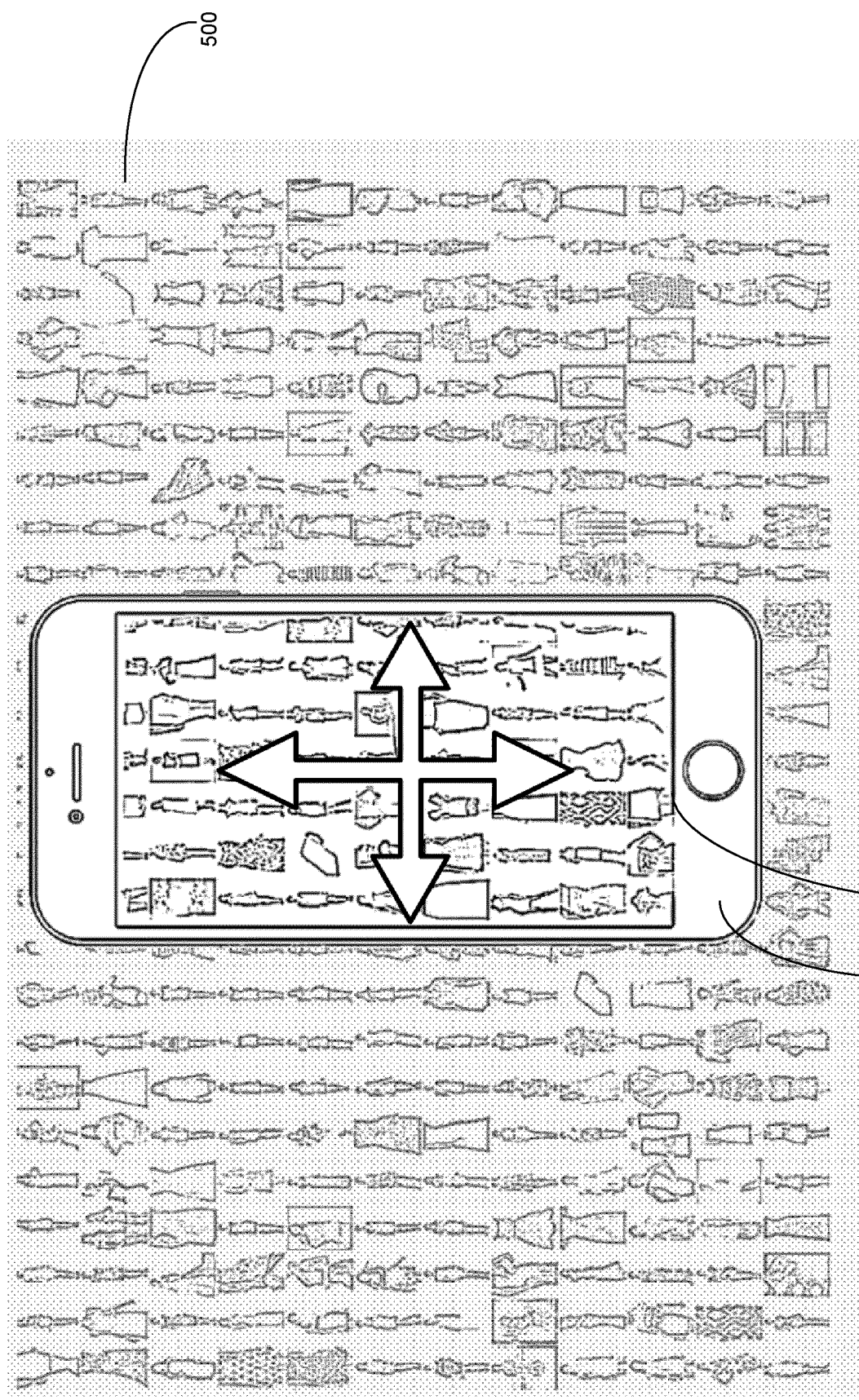
FIG. 7 shows a schematic example of a scrollable item array.

FIG. 7 shows a zoomed-out view of large bi-directionally scrollable item array 500 (product map) displayed on a touchscreen display 702 of a mobile device 700. The UI 104 is provided, in this example, as the touchscreen display 702. In this zoomed-out view (low zoom level), a relatively large number of item images are visible on the touchscreen display 702. As can be seen, the item array 500 extends beyond the available display area of the touchscreen display 702 in the sense that item images of the display set 107 have already been selected for array positions within the item array 500 which are not currently visible. In other words, there exist a number of array position within the item array 500 which have already been populated with selected item images but which are not currently visible. The user can instigate scroll events (e.g. scroll gestures) at the touchscreen display 702, in order to navigate to a such array positions, in order to see the item images with which they have been populated. As noted above, unpopulated array positions may also be populated dynamically with new item images selected from the item DB 102 in response to scroll/zoom events at the touchscreen simple 702, either as they become visible or in anticipation of them becoming visible.

Figure 8:
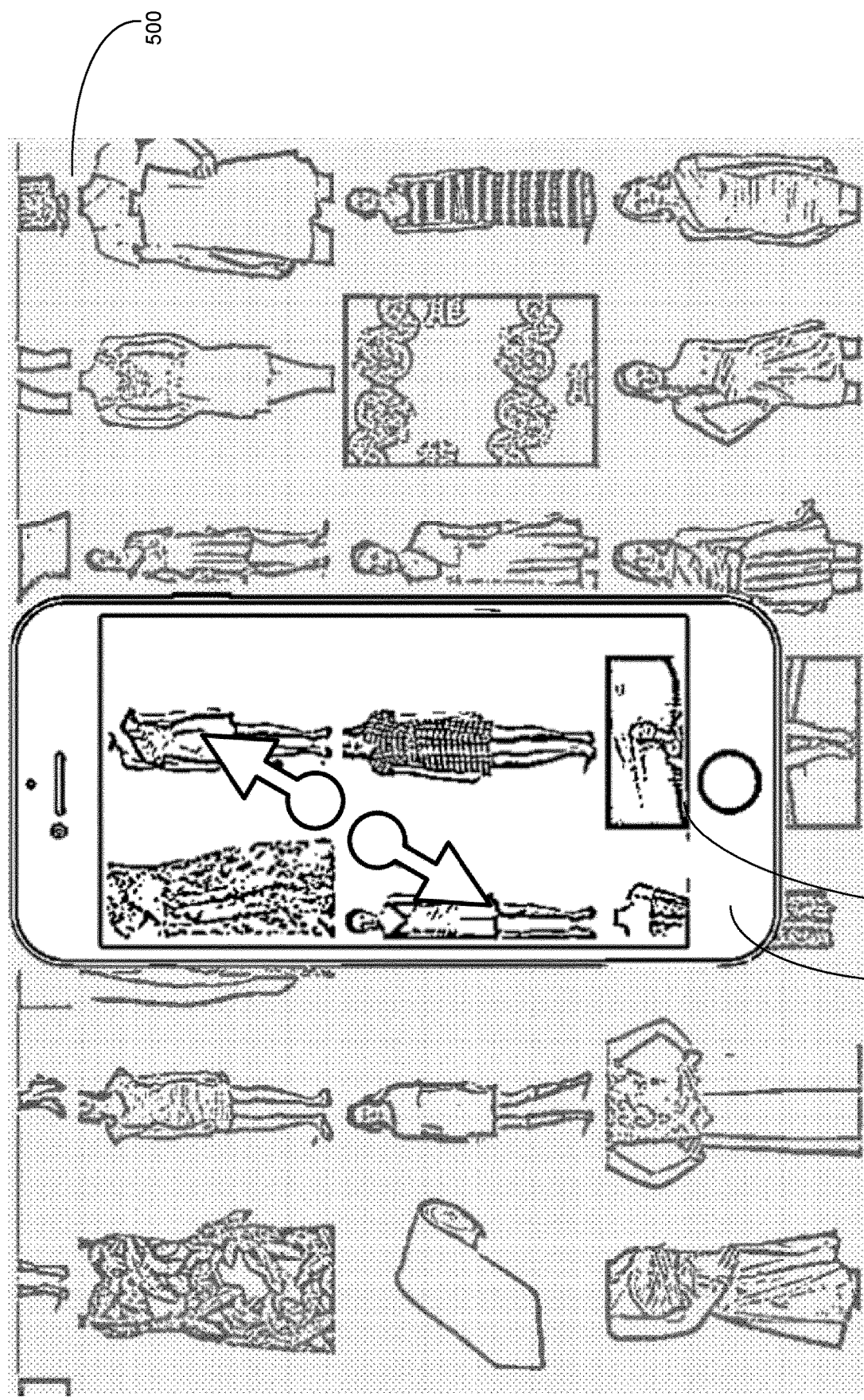
FIG. 8 shows a schematic example of a zoomable item array.

FIG. 8 shows a zoomed in view of the scrollable product map 500 for closer inspection of interesting items (to understand whether the user like the item).

Note, the zoomed in view does not replace the product information page in which the item details 124 are displayed. Rather, in this example, a separate product information page is provided (not shown), where, for example, multiple views of the item may be available (i.e. one or more additional item images may be included in the item details 124), along with other details such as brand, price, description etc.

Figure 9:
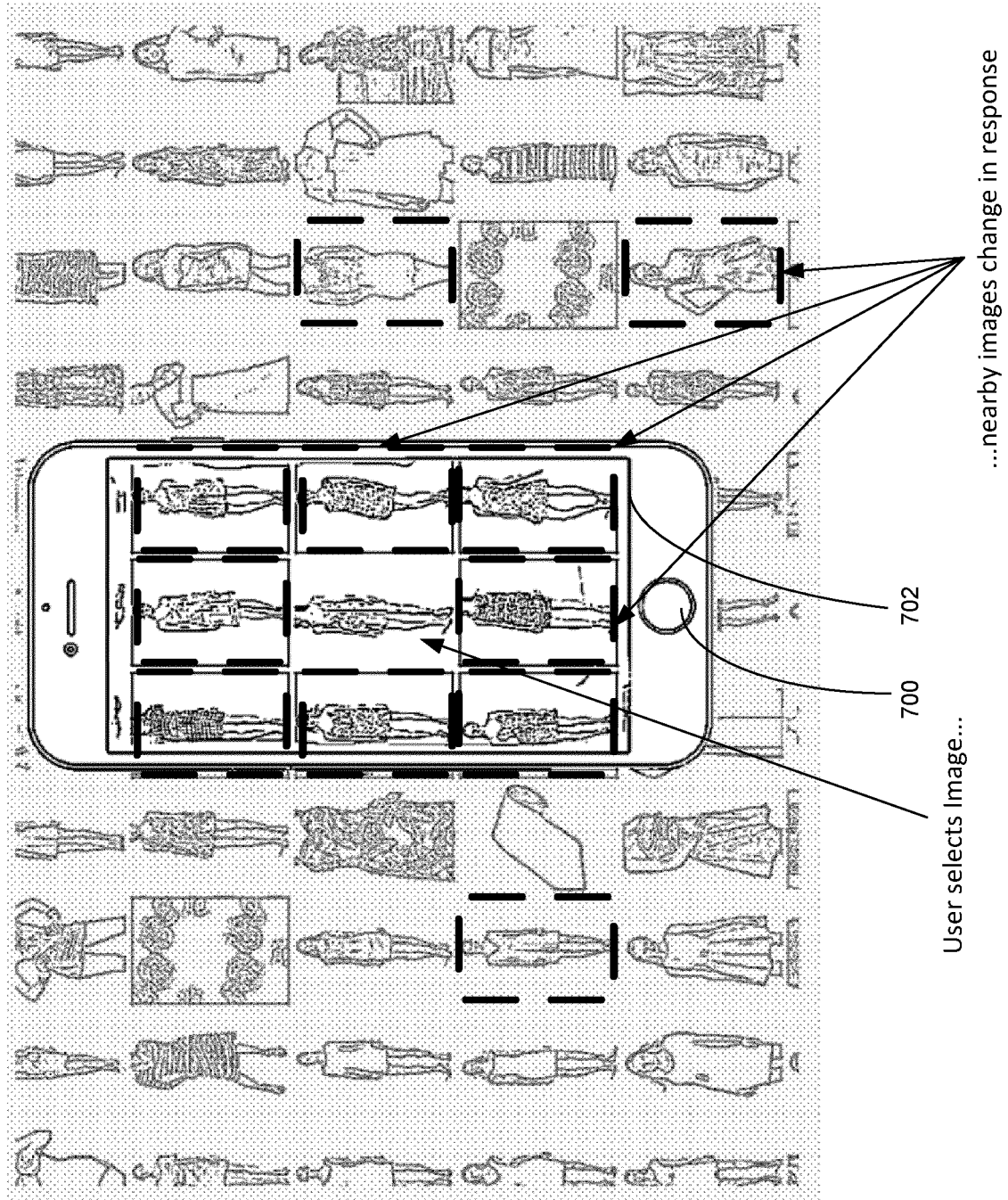
FIG. 9 shows an example of how a scrollable item array may be updated in response to a user selecting a particular image within the item array.

FIG. 9 shows a further example of how the item array 500 may be updated in response to a user selecting a particular item image. In this example, product images around the selected item image—not limited to just those in its immediate vicinity—change to related item images that are either similar to the original item or only partially similar to allow exploration (by applying the item image selection principles set out above).

Although specific grid arrangements and display areas are depicted in the figures, it will be appreciated that these are illustrative and by no means exhaustive. An item array can be implemented with a display area of any size or dimensions on a wide variety of devices. Accordingly, the number of item images that is visible at a given zoom level and the arrangement of those item images within the available display area will vary depending on the context, and in particular may depend on the size and dimensions of the available display area.

Whilst specific embodiments have been described for the sake of illustration, variations and alternatives will no doubt be apparent to those skilled in the art in view of the teaching presented herein. The scope of the present disclosure is not defined by the described embodiments but only by the accompanying claims.

The invention claimed is:

1. A computer-implemented method of determining visual preference of a user for selecting item images from at least one item database according to the visual preference of the user, the method being implemented by one or more computer processors and comprising:
   selecting a display set of item images from the at least one item database;
   causing the display set of item images to be displayed at a user interface in an item array at respective array positions;
   detecting engagement events at the user interface between the user and engaged-with item images of the display set;
   using the detected engagement events to determine a visual preference hypothesis for the user based on visual features extracted from the engaged-with item images; and
   updating the display set with new item images selected from the at least one item database by comparing visual features extracted from the new item images with the visual preference hypothesis wherein the visual preference hypothesis corresponds to a type of visual feature or visual feature combination, and biases the selection of the new item images toward item images having visual features or combinations of visual features of that corresponding type which match the visual preference hypothesis but which exhibit variation in at least one additional visual feature type for testing the visual preference hypothesis, wherein the visual preference hypothesis is tested based on a level of user exposure to item images for testing the visual preference hypothesis and a level of user engagement with the item images for testing the visual preference hypothesis, and wherein the level of user exposure and the level of user engagement are stored as associated information with the visual preference hypothesis, the associated information embodied in a confidence measure associated with the visual preference hypothesis;
   wherein the display set is updated in dependence on the confidence measure, and the confidence measure is, in turn, updated as the user continues to engage with the new item images of the updated display set;
   wherein subsequent engagement events between the user and engaged-with item images of the display set continue to be detected and used to iteratively refine the visual preference hypothesis as the user continues to interact with the display set, and the display set continues to be iteratively updated as the user continues to interact with the updated display set and the visual preference hypothesis is refined;
   wherein the engagement events comprise at least one active engagement event in which the user selects an item image of the display set at the user interface, wherein, in response to the active engagement event, at least one item image is removed from the display set, and replaced with one of the new item images displayed at the array position of the removed item image; and/or
   wherein the item array is zoomable and/or scrollable, and at least some of the new item images are selected dynamically in response to zoom events and/or scroll events at the user interface so as to dynamically populate previously unpopulated array positions within the item array based on the visual preference hypothesis.

2. The method of claim 1, wherein the engagement events comprise at least one active engagement event in which the user selects an item image of the display set at the user interface.

3. The method of claim 1, wherein the removed item image is removed from the display set based on the array position of the removed item image relative to the selected item image.

4. The method of claim 1, wherein the display set is additionally updated with one or more escape item images from the item database having visual features which are selected because they do not match the visual features of the engaged-with item images.

5. The method of claim 1, wherein each of the item images is stored in an item record of the item database with associated item details, wherein the item details associated with each item image of the display set are accessible via the user interface.

6. The method of claim 1, wherein the visual features extracted from each item image comprise visual features which have been extracted by applying one or more trained machine learning visual feature extractors to image data of that item image.

7. The method of claim 1, wherein at least one derived visual preference hypothesis is determined based on the one visual preference hypothesis, by applying a transformation to at least one visual feature of the visual preference hypothesis, the derived visual preference hypothesis pertaining to the transformed visual feature, wherein the visual preference hypothesis and the derived visual preference hypothesis are used to update the display set.

8. The method of claim 1, wherein at least a first visual preference hypothesis and a second visual preference hypothesis are determined using the engagement events;
   wherein the first visual preference hypothesis corresponds to a first type of visual feature or visual feature combination, and biases the selection of a first subset of the new item images toward item images having visual features or combinations of visual features of that corresponding first type which match the first visual preference hypothesis but which exhibit variation in a second type of visual feature or visual feature combination; and
   wherein the second visual preference hypothesis corresponds to the second type of visual feature or visual feature combination, and biases the selection of a second subset of the new item images toward item images having visual features or combinations of visual features of that corresponding second type which match the second visual preference hypothesis but which exhibit variation in the first type of visual feature or visual feature combination.

9. The method of claim 8, wherein the first and second visual hypothesis are determined in response to the user engaging with at least one item image of the display set;
   wherein the at least one engaged-with item image has a visual feature or combination of visual features of the first type which is used to determine the first visual preference hypothesis; and
   wherein the at least one engaged-with item image has a visual feature or combination of visual features of the second type which is used to determine the second visual preference hypothesis;
   whereby the biased selection of the first and second subsets tests whether the user has a preference for (i) the visual feature or combination of visual features of the at least one engaged-with item image of the first type based on a response of the user to the first subset, or (ii) the visual feature or combination of visual features of the at least one engaged-with item image of the second type based on a response of the user to the second subset.

10. The method claim 1, wherein the engagement events comprise at least one passive engagement event which indicates passive engagement with an item image of the display set without the user selecting the passively engaged-with item image.

11. The method of claim 10, wherein the at least one passive engagement event comprises one or more scroll events which denote at least one of:
   a scroll speed;
   a change in scroll speed, a scroll direction;
   a change in scroll direction; and
   an eye tracking event.

12. The method of claim 1, wherein the visual preference hypothesis is determined based on one or more visual features of one or more item images of the display set with which the user has not engaged, wherein a lack of engagement with at least one item image of the display set is detected based on at least one negative interaction event at the user interface relating to the at least one item image.

13. The method of claim 12, wherein the item array is scrollable, and wherein the negative interaction event is a scroll event directed away from the item image.

14. The method of claim 1, wherein the item images are arranged in item groups within the item array based on at least one visual feature type, such that item images with similar visual features of that visual feature type are grouped together.

15. The method of claim 14, wherein the engagement events comprise at least one passive engagement event which indicates passive engagement with an item image of the display set without the user selecting the passively engaged-with item image, and wherein the at least one passive engagement event comprises a scroll event and the visual preference hypothesis is determined or updated based on a direction of the scroll event at the user interface relative to one of the item groups.

16. The method of claim 15, wherein the visual preference hypothesis is determined or updated to indicate:
   a preference for a visual feature of that visual feature type which matches the item group when the scroll event is directed toward that item group and/or when a scroll speed towards that item group is reduced by the user and/or when a scroll action past or through that item group is reversed, or
   a dislike of a visual feature of that visual feature type which matches the item group when the scroll event is directed away from that item group and/or when a scroll speed away past, through or away from that item group is increased or maintained by the user.

17. A computer system for determining visual preference information for a user, the computer system comprising:
   one or more computer processors;
   a non-transitory computer readable medium storing a plurality of instructions, which when executed, cause the one or more processors to:
   select a display set of item images from the at least one item database;
   cause the display set of item images to be displayed at a user interface in an item array at respective array positions;
   detect engagement events at the user interface between the user and engaged-with item images of the display set;
   use the detected engagement events to determine a visual preference hypothesis for the user based on visual features extracted from the engaged-with item images; and
   update the display set with new item images selected from the at least one item database by comparing visual features extracted from the new item images with the visual preference hypothesis wherein the visual preference hypothesis corresponds to a type of visual feature or visual feature combination, and biases the selection of the new item images toward item images having visual features or combinations of visual features of that corresponding type which match the visual preference hypothesis but which exhibit variation in at least one additional visual feature type for testing the visual preference hypothesis, wherein the visual preference hypothesis is tested based on a level of user exposure to item images for testing the visual preference hypothesis and a level of user engagement with the item images for testing the visual preference hypothesis, and wherein the level of user exposure and the level of user engagement are stored as associated information with the visual preference hypothesis, the associated information embodied in a confidence measure associated with the visual preference hypothesis;
   wherein the display set is updated in dependence on the confidence measure, and the confidence measure is, in turn, updated as the user continues to engage with the new item images of the updated display set;
   wherein subsequent engagement events between the user and engaged-with new item images of the display set continue to be detected and used to iteratively refine the visual preference hypothesis as the user continues to interact with the display set, and the display set continues to be iteratively updated as the user continues to interact with the updated display set and the visual preference hypothesis is refined;
   wherein the engagement events comprise at least one active engagement event in which the user selects an item image of the display set at the user interface, wherein, in response to the active engagement event, at least one item image is removed from the display set, and replaced with one of the new item images displayed at the array position of the removed item image, and/or
   wherein the item array is zoomable and/or scrollable, and at least some of the new item images are selected dynamically in response to zoom events and/or scroll events at the user interface so as to dynamically populate previously unpopulated array positions within the item array based on the visual preference hypothesis.

18. A computer program product, comprising a non-transitory computer-readable medium having computer-readable program code embodied therein to be executed by one or more processors, the program code including instructions to:
  select a display set of item images from at least one item database;
  cause the display set of item images to be displayed at a user interface in an item array at respective array positions;
  detect engagement events at the user interface between a user and engaged-with item images of the display set;
  use the detected engagement events to determine a visual preference hypothesis for the user based on visual features of the engaged-with item images wherein the visual preference hypothesis corresponds to a type of visual feature or visual feature combination, and biases the selection of the new item images toward item images having visual features or combinations of visual features of that corresponding type which match the visual preference hypothesis but which exhibit variation in at least one additional visual feature type for testing the visual preference hypothesis, wherein the visual preference hypothesis is tested based on a level of user exposure to item images for testing the visual preference hypothesis and a level of user engagement with the item images for testing the visual preference hypothesis, and wherein the level of user exposure and the level of user engagement are stored as associated information with the visual preference hypothesis, the associated information embodied in a confidence measure associated with the visual preference hypothesis;
  wherein the display set is updated in dependence on the confidence measure, and the confidence measure is, in turn, updated as the user continues to engage with the new item images of the updated display set; and
  update the display set with new item images selected from the at least one item database by comparing visual features of the new item images with the visual preference hypothesis;
  wherein subsequent engagement events between the user and engaged-with new item images of the display set continue to be detected and used to iteratively refine the visual preference hypothesis as the user continues to interact with the updated display set, and the display set continues to be iteratively updated as the user continues to interact with the updated display set and the visual preference hypothesis is refined;
  wherein the engagement events comprise at least one active engagement event in which the user selects an item image of the display set at the user interface, wherein, in response to the active engagement event, at least one item image is removed from the display set, and replaced with one of the new item images displayed at the array position of the removed item image, and/or
  wherein the item array is zoomable and/or scrollable, and at least some of the new item images are selected dynamically in response to zoom events and/or scroll events at the user interface so as to dynamically populate previously unpopulated array positions within the item array based on the visual preference hypothesis.

* * * * *